United States Patent [19]

Kirschling

[11] 3,858,700
[45] Jan. 7, 1975

[54] SELF-ADJUSTING CLUTCH OR BRAKE

[75] Inventor: Thomas J. Kirschling, Milwaukee, Wis.

[73] Assignee: FMC Corporation, Chicago, Ill.

[22] Filed: July 9, 1973

[21] Appl. No.: 377,666

Related U.S. Application Data

[62] Division of Ser. No. 251,893, May 10, 1972, Pat. No. 3,762,522.

[52] U.S. Cl. .......................... 192/111 A, 188/71.8
[51] Int. Cl. ............................................ F16d 13/75
[58] Field of Search .................. 192/111 A, 70.25; 188/71.8

[56] References Cited
UNITED STATES PATENTS

| | | | |
|---|---|---|---|
| 2,900,052 | 8/1959 | Frayer et al. | 188/71.8 |
| 2,965,207 | 12/1960 | Snyder | 192/111 A |
| 3,032,144 | 5/1962 | Stanton | 188/71.8 |
| 3,223,207 | 12/1965 | Burnett et al. | 192/111 A |
| 3,618,714 | 11/1971 | Croswell | 192/111 A |

Primary Examiner—Benjamin W. Wyche
Attorney, Agent, or Firm—Henry C. Fuller

[57] ABSTRACT

A clutch or brake with relatively movable friction surfaces is provided with an adjustable stop mechanism which includes position adjusting retainer rings to maintain a pre-determined air gap between the friction faces of the clutch armature and magnet frame when separated irrespective of wear. The retainer rings frictionally grip sleeves which are reciprocal between spaced stops on studs or pins fixed to the clutch hub and upon which the armature is reciprocable. The frictional grip of the retainer rings is overcome by the magnetic flux of the field magnet when energized to enable the armature to shift axially to an adjusted position on the sleeves to compensate for wear of the axially facing clutch friction surfaces. The one-way retaining rings maintain the armature at the adjusted position on the sleeves when the clutch is de-energized with the clutch faces at the pre-determined air gap.

3 Claims, 4 Drawing Figures

PATENTED JAN 7 1975 3,858,700

SELF-ADJUSTING CLUTCH OR BRAKE

This is a divisional application of U.S. Pat. No. 3,762,522, which matured from application Ser. No. 251,893, filed May 10, 1972.

BACKGROUND OF INVENTION

The present invention relates to self-adjustment of an armature in a clutch, brake or electromagnetic coupling to prevent an excessive air gap developing between the armature and magnet body due to wear of the friction surfaces. Various prior art patents such as U.S. Pat. Nos. 2,705,056; 2,705,058; 3,297,122; 3,394,787 disclose position adjusting devices for clutches and brakes. The present invention differs from the subject matter of these patents in that a change of position of the armature occurs when the grip of a friction positioning device is overcome when the clutch is energized.

SUMMARY OF INVENTION

The invention provides a position adjusting mechanism for the armature of a brake or clutch which functions as an adjustable stop to limit the travel of the armature into the de-energized position to maintain a constant air gap between the friction surfaces notwithstanding wear of these surfaces. The adjustment of the position mechanism occurs when the clutch is energized.

The position adjusting device of the invention includes parts, some of which shift axially with the clutch armature which is movable on one or more pins or studs which extend through apertures in the armature. The studs are secured to a portion of an armature hub which is splined to the armature plate. Sleeves extend through the apertures and are reciprocable on the studs between spaced stops comprising the hub portion and the stud head.

A retainer or lock ring with sleeve gripping elements is arranged around the sleeve and in one embodiment is fixed to the armature and in another embodiment abutting the armature. A spring arranged around the stud and the sleeve and between the retainer and the head on the stud biases the armature toward the de-energized position.

When the adjacent friction faces of the armature or clutch wear, and when the clutch is energized, shifting of the armature on the sleeve occurs after the sleeve engages the stop. If the friction faces are not engaged, the retainer is nudged on the sleeve a distance sufficient to enable the armature to engage the magnet body and thus limit the axial travel of the armature. Inasmuch as the retainer can only move in one direction, it maintains the armature at the adjusted position on the sleeve when the armature returns to the de-energized position and the armature remains at this position until wear causes the armature to nudge the retainer further on the sleeve.

Further objects, features and advantages of the present invention will become apparent from the following disclosure.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
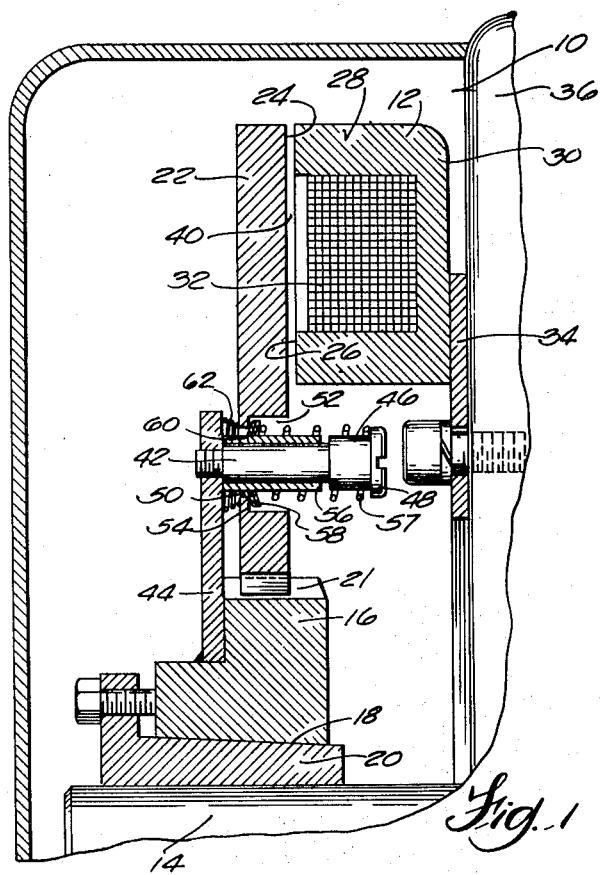
FIG. 1 is a fragmentary view partially in side elevation and partially in axial section of a clutch embodying the invention with the clutch armature in a de-energized position.

In the drawings, FIG. 1 discloses a clutch or brake generally designated 10. If the magnet frame or body 12 is stationary, the device constitutes a brake. If the magnet part 12 rotates, the device is a clutch. For convenience of illustration, the clutch as shown is used for braking purposes.

The part which is braked is the shaft 14 which carries a hub 16 having an inner periphery 18 which is complementary to a tapered sleeve 20. The hub 16 is splined at 21 to an armature 22 to carry the torque load and afford axial movement of the armature as well as rotation with shaft 14. The armature 22 has a friction clutch face 24 which is movable to and from engagement with the complementary face 26 of a clutch member 28, which is associated with a magnet frame 30 provided with a magnet winding or coil 32. A mounting plate 34 secures the magnet frame 28 to a stationary part 36.

When the winding 32 is energized, the magnetic flux flowing through the magnet body 28 draws the armature 22 an armature face 24 into contact with the face 26 of the magnet body 28 resulting in clutching or braking action. Whether the device is used as a clutch or brake, repetitive engagement of surfaces 24 and 26 results in wear of the friction faces 24, 26 and shown in FIG. 3.

The invention contemplates use of an adjustable stop to maintain the gap 40 between the adjacent surfaces 24 and 26 at a constant dimension. In the embodiment shown in FIGS. 1 to 4, the clutch includes one or more studs or guides 42 which are threaded into a plate 44 which is fixed to the hub 16. The studs have a shoulder 46 and a head 48 for purposes subsequently described. The studs extend through apertures 50 in the armature 22. Each aperture 50 includes a counterbore 52 with a shoulder 54. The position adjusting mechanism includes a sleeve or slide 56 which is arranged around the stud 42 and reciprocable between the plate 44 and the shoulder 46 on the stud 42, and one or more retainer rings 58 with sleeve gripping edges 60 which enable one-way movement of the retainer rings relative to the sleeve.

Figure 2:
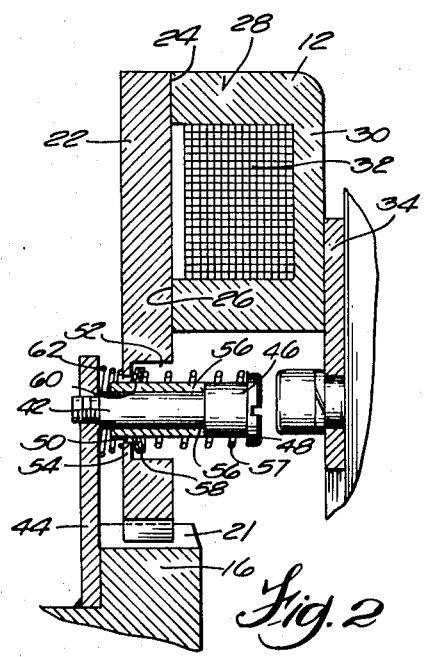
FIG. 2 is a fragmentary view similar to FIG. 1 showing the armature in the energized position engaging the magnet body.

To return the armature 22 from the energized position shown in FIG. 2 to the de-energized position shown in FIG. 1, spaced by the gap 40 from the clutch surface 26, the sleeve carries a spring 57 which is arranged around the sleeve and the shoulder 46 of the stud and located between the head 48 and a retainer 58.

Figure 3:
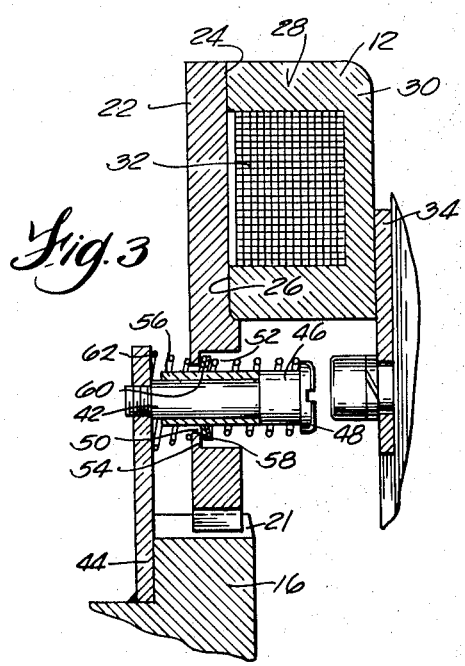
FIG. 3 is a view similar to FIG. 1 showing the adjacent surfaces of the armature and magnet body after wear and with the parts in the energized position.
Figure 4:
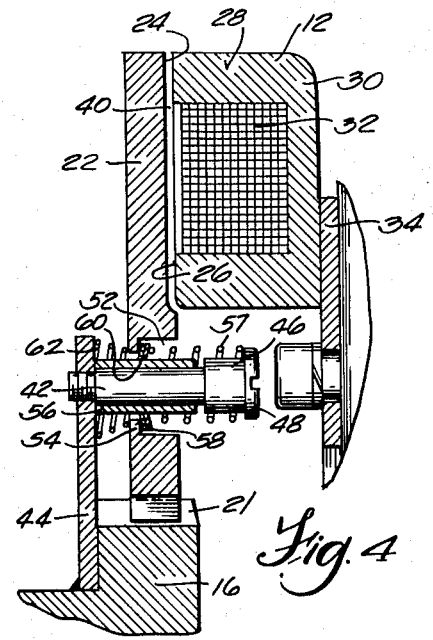
FIG. 4 is a view similar to FIG. 3 with the armature in the de-energized position with the armature at an adjusted wear compensating position.

The adjustment of the armature position relative to the sleeve 56 to compensate for wear is best shown in FIGS. 3 and 4, which show wear of both the surfaces 24 and 26 resulting from repetitive engagement of the surfaces.

If the armature face 24 does not engage face 26 when the clutch is energized and after the sleeve 56 abuts the stop or shoulder 46, the armature 22 will nudge the retainer 58 along the sleeve until the armature face 24 engages the magnet face 26. When the magnet is de-energized, the armature 22 is released to return to the de-energized position shown in FIG. 4 under the bias of spring 57. Movement of the armature 22 away from the magnet 28 occurs until the sleeve 56 engages the stop plate 44. A weak spring 62 holds the armature 22 against the retainer rings 58 to assure that the armature is maintained at the adjusted position. Inasmuch as the armature 22 has shifted axially to the right on the sleeve 56 as viewed in FIG. 4, the pre-set clearance or air gap 40 is maintained at the initial pre-set distance.

What is claimed is:

1. A self-adjusting clutch structure comprising a hub and first and second clutch members having opposed axially faced engageable friction surfaces spaced by a predetermined air gap when said clutch is de-energized, with said first member being movable axially over a guide to engage said second clutch member, said axially movable member being a clutch armature supported by and movable relative to said clutch hub, a slide movable on said guide between first and second stops and retaining means on said slide abutting said axially movable clutch member and frictionally engaged with said slide and affording movement of said movable clutch member relative to said slide after said slide engages said first stop if required to cause engagement of said friction surfaces, with said retaining means maintaining said movable clutch member at the adjusted position on said slide when said clutch is de-energized, said guide having a shoulder and a head with said shoulder comprising said first stop and including a spring arranged around said slide and said shoulder and located between said retaining means and said head to bias said axially movable first member to the de-energized position and including a second spring located between said hub and said armature to hold said armature against said retaining means.

2. A self-adjusting clutch structure comprising first and second clutch members having opposed axially faced engageable friction surfaces spaced by a predetermined air gap when said clutch is deenergized, with said first member being movable axially over a guide to engage said second clutch member, a slide movable on said guide between first and second stops and retaining means on said slide abutting said axially movable clutch member and frictionally engaged with said slide and affording movement of said movable clutch member relative to said slide after said slide engages said first stop if required to cause engagement of said friction surfaces, with said retaining means maintaining said movable clutch member at the adjusted position on said slide when the clutch is de-energized and wherein said axially movable member is a clutch armature supported by and movable relative to a clutch hub and said guide comprises a stud secured to said hub, and wherein said slide comprises a sleeve arranged around said stud, said stud having a shoulder and a head with said shoulder comprising said first stop and including a spring arranged around said sleeve and said shoulder and located between said retaining means and said head to bias said armature to the de-energized position and including a second spring located between said hub and said armature to hold said armature against said retaining means.

3. A device in accordance with claim 2 wherein said retaining means comprises a retainer ring with gripping fingers frictionally engaging said sleeve and affording movement of said ring in one direction with respect to said sleeve.

* * * * *